United States Patent [19]
Nikaido

[11] 4,099,106
[45] Jul. 4, 1978

[54] COMPOSITE PULSE MOTOR FOR A TIMEPIECE

[75] Inventor: Akira Nikaido, Tachikawa, Japan

[73] Assignee: Citizen Watch Co., Ltd., Tokyo, Japan

[21] Appl. No.: 679,799

[22] Filed: Apr. 23, 1976

[30] Foreign Application Priority Data

Apr. 24, 1975 [JP] Japan .................. 50-50138

[51] Int. Cl.² .............................................. H02K 7/06
[52] U.S. Cl. .................... 318/115; 318/135; 310/49 R; 310/114
[58] Field of Search .............. 318/115, 135, 687; 310/49, 112, 114, 126

[56] References Cited

U.S. PATENT DOCUMENTS

| | | | |
|---|---|---|---|
| 3,441,819 | 4/1969 | Palmero | 318/115 |
| 3,453,510 | 7/1969 | Kreuter et al. | 310/49 |
| 3,745,433 | 7/1973 | Kelby, Jr. et al. | 318/115 |

OTHER PUBLICATIONS

IBM Tech. Disclosure Bulletin, Meier, vol. 16, No. 2, 7/63, p. 604.

*Primary Examiner*—Donovan F. Duggan
*Attorney, Agent, or Firm*—Koda and Androlia

[57] ABSTRACT

A compound pulse motor for driving a printer or the like comprising an armature having linear magnetic poles and rotational magnetic poles and a stator having stationary linear magnetic poles and stationary rotational magnetic poles. In operation, the linear magnetic poles of the armature interact with the stationary linear magnetic poles of the stator to produce transverse motion of the armature. Furthermore, when excited, the rotational magnetic poles of the armature and the stationary rotational magnetic poles of the stator interact to produce rotational motion of the armature.

3 Claims, 12 Drawing Figures

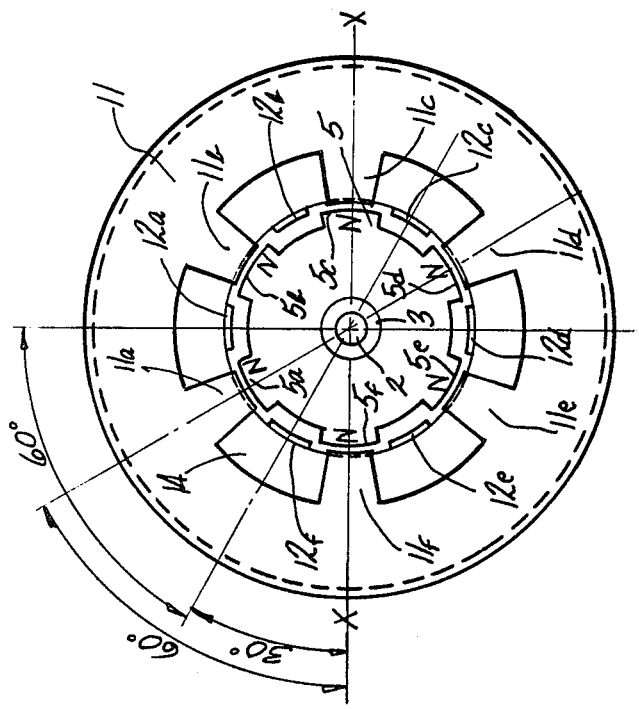
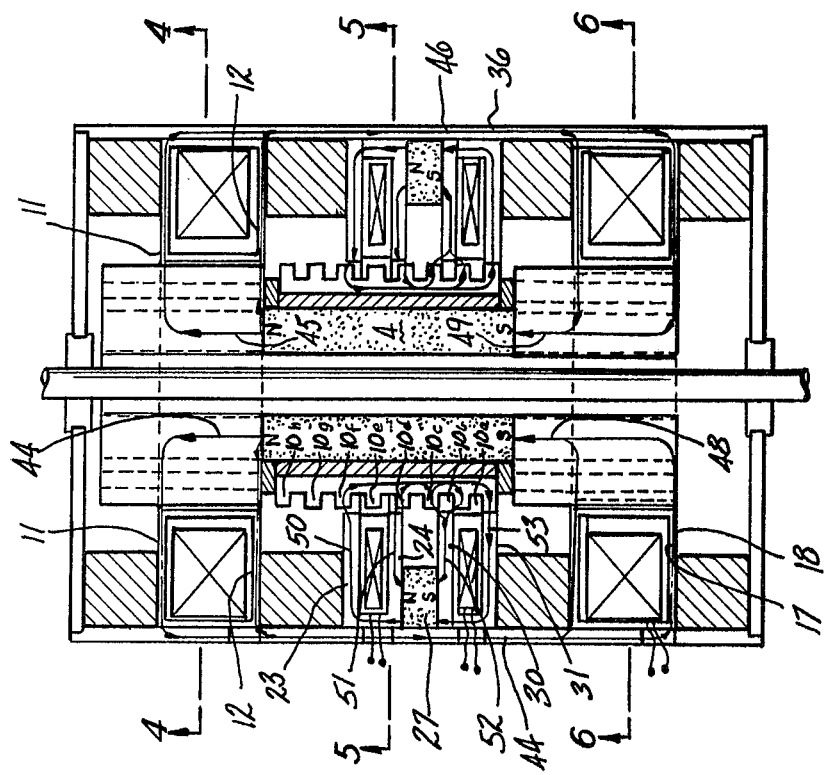
FIG-4
FIG-3

4,099,106

COMPOSITE PULSE MOTOR FOR A TIMEPIECE

BACKGROUND OF THE INVENTION

1. Field of the Invention

This invention relates to pulse motors and more particularly to compound pulse motors capable of both rotational and transverse motion of the armature.

2. Prior Art

Pulse motors have been used in the past with serial printers, but the pulse motors which have been employed have mostly been those which only produce rotary movement. In serial printers, in order to select the letters on the top of the letter cap, rotary movement and transverse movement are required. Therefore, normally, two pulse motors are utilized. As a result of having to use two motors to perform the two separate functions, such serial printers have the shortcoming of such wide spacing. Furthermore, such serial printers are higher in cost.

SUMMARY OF THE INVENTION

It is the general object of the present invention to provide a pulse motor capable of producing both rotational and transverse movement.

It is another object of the present invention to provide a post motor which is relatively low in cost.

It is still another object of the present invention to provide a pulse motor which is simple to manufacture.

It is yet another object of the present invention to provide a pulse motor which can be used with serial printers or typewriters.

In keeping with the principles of the present invention, the objects are accomplished by a unique compound function pulse motor (hereinafter referred to as a "compound motor") for driving a printer or the like comprising an armature rotatively and slightably coupled to an axial shaft and a compound stator. The armature comprises a pair of linear magnetic poles and a pair of rotational magnetic poles. The stator comprises a pair of linear stator poles and a pair of stationary rotational poles. In operation, when the linear stator poles are excited, the linear stator poles interact with the linear magnetic poles of the armature to produce transverse motion of the armature along the axial shaft. Furthermore, when the stationary rotational magnetic poles are excited, the stationary rotational poles interact with the rotational magnetic poles of the armature to produce rotational motor of the armature about the axial shaft.

BRIEF DESCRIPTION OF THE DRAWINGS

The above mentioned and other features and objects of the present invention will become more apparent by reference to the following description taken in conjunction with the accompanying drawings wherein like reference numerals, like elements in which:

FIG. 3 is a descriptive flow of the bias flux of the permanent stator magnets and the permanent armature magnet of the compound pulse motor of FIG. 1;

FIG. 4 is a cross-sectional view of the embodiment in FIG. 1 looking along the lines A—A;

DETAILED DESCRIPTION OF THE INVENTION

Figure 2:
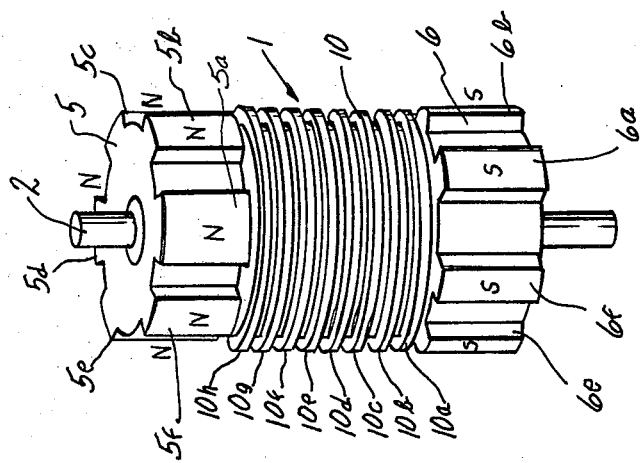
FIG. 2 is a pictorial view of an armature of the embodiment of FIG. 1.
Figure 1:
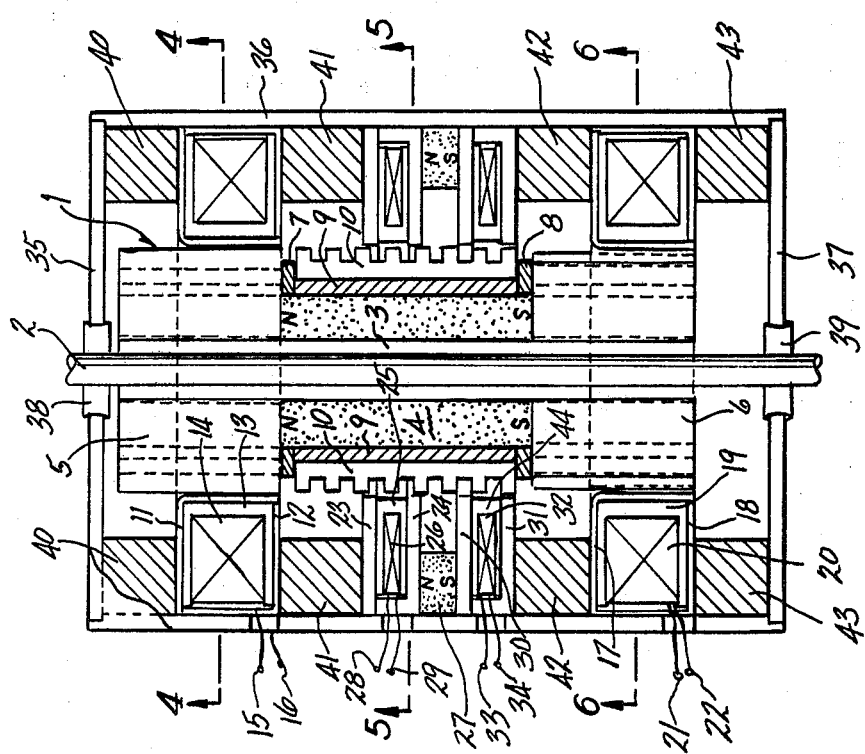
FIG. 1 is a cross section of a compound pulse motor in accordance with the teachings of the present invention.

Referring to FIGS. 1 and 2, shown therein is a compound pulse motor in accordance with the teachings of the present invention. The compound pulse motor comprises a armature 1. Armature 1 includes an armature shaft 2 covered by a non-magnetic tubular number 3. Cylindrical permanent magnet 4 is coupled to the central portion of tubular member 3. Cylindrical permanent magnet 4 is coupled to the central portion of the tubular member 3 and the magnetic field of cylindrical permanent magnet 4 is orientated in the direction of the shaft. Rotary magnetic pole 5 and 6 are coupled to tubular member 3 at the opposite ends of armature 1. Tubular non-magnetic member 9 is provided about cylindrical permanent magnet 4. Linear poles 10 made of a magnetic material and formed in the shape of a tube having grooves cut in at a fixed pitch is provided over non-magnetic number 9. Non-magnetic washers 7 and 8 are provided at both ends of nonmagnetic number 9 and are interposed between poles 10 and the rotary magnetic poles 5 and 6.

In the preferred embodiment shown, the rotary poles 5 and 6 have six teeth. Also, looking out from armature shaft 2, rotary poles 5 and 6 differ from each other in terms of electrical phase by 180° and are constructed such that teeth 5a, 5b, 5c, 5d, 5e and 5f form an electrical phase angle of 360°, as do teeth 6a, 6b, 6c, 6d, 6e and 6f.

In practice, the non-magnetic components 3, 7, 8 and 9 can be made by injection moulding of plastic. Also, rotary poles 5 and 6 can be made by pressing thin sheets of magnetic material together. The linear poles can be made by cutting grooves in tubular material. Also, the linear poles can be made by putting together disc-shape sheets of magnetic material of different outer diameters.

Phase I upper stationary magnetic pole 7 is in magnetic relationship with rotary pole 5. Phase II lower stationary pole 12 is also a magnetic relationship with rotary pole 5. Coil bobbin 13 is of an annular disc-shape with grooves cutting it. Phase I excitation coil 14 is wound on coil bobbin 13 and creates flux with respect to rotary pole 5. Excitation coil 14 is further provided with input terminals 15 and 16.

Phase II lower stationary pole 18 is magnetically related to rotary pole 6. Coil bobbin 19 is substantially the same as coil bobbin 13. Phase II excitation coil 20 is wound on coil bobbin 19. Phase II excitation coil 20 is further provided with input terminals 21 and 22. Permanent stator magnet 27 is located substantially in the center of the compound pulse motor and is magnetically oriented in the direction of the shaft 2. Permanent stator magnet 27 is disc shaped and annular. Phase II disc-shaped, annular, linear upper and lower stationary poles 23 and 24 are provided adjacent permanent stator magnet 27 and about linear pole 10. Phase I linear stator coil 26 is wound on annular coil bobbin 25. Phase I linear stator coil 26 is further provided with input terminals 28 and 29.

Phase II disc-shaped, annular, linear upper and lower stationary poles 30 and 31 are provided adjacent permanent magnet 27 and about linear pole 10. Phase II excitation coil 32 is wound on annular shaped coil bobbin 4. The integral phase n between Phase I and II of the linear stationary poles is computed by multiplying it by the pitch and adding ¼ pitch. In other words, the thickness of the stator permanent magnet 27 is constructed so as to match the width of the above-mentioned pitch.

Hollow cylindrical non-magnetic materials 40, 41, 42 and 43 secure stationary poles Phase I and Phase II and the linear stationary pole, Phase I and Phase II, to the frame 36. Bearings 38 and 39 are coupled respectively to plates 35 and 36 which are secured to both ends of the frame 36. Bearings 38 and 39 rotatively support shaft 2.

Referring to FIG. 3, shown therein as the bias flux flow of the armature permanent magnet 4 and the stator permanent magent 27. The flux of the armature permanent magnet 4 forms a closed magnetic circuit through Phase I stationary poles 11 and 12, the frame 36 and Phase II stationary poles 17 and 18.

The bias flux of stator magnet 27 passes through Phase I linear stationary poles 23 and 24, as shown by lines 50 and 51, through linear poles 10f and 10d, through linear poles 10c, 10b, and 10a, and through Phase II stationary poles 30 and 31, as shown by lines 52 and 53, forming a closed magnetic circuit. As shown in FIG. 3, magnetic circuits for the components for rotary motion and the components for linear motion are formed independently.

Referring to FIGS. 1 and 2, shown therein is a compound pulse motor in accordance with the of the present invention. The compound pulse motor comprises an armature 1. Armature 1 includes an armature shaft 2 covered by a non-magnetic tubular member 3. Cylindrical permanent magnet 4 is coupled to the central portion of tubular member 3 and the magnetic field of cylindrical permanent magnet 4 is orienated in the direction of the shaft. Rotary magnetic pole 5 and 6 are coupled to tubular member 3 at the opposite ends of armature 1. Tubular non-magnetic member 9 is provided about cylindrical permanent magnet 4.

FIG. 4 is a cross section along the line A—A of FIG. 1 and shows the mutual relationship of the Phase I rotary pole 5 and the stationary poles 11 and 12. The teeth 5a, 5b, 5c, 5d, 5e and 5f of the rotary pole are constructed at a spatial pitch of 60°. The polar teeth of the upper stationary pole 11 are at the same angle, and components 11a, 11b, 11c, 11d, 11e and 11f, which relate to the teeth of the rotary pole 5, are bent downward 90° from the surface of the paper. Likewise, the lower stationary polar teeth 12a, 12b, 12c, 12d, 12e and 12f are bent upward and form an angle of 90° with the paper surface. The spatial pitch of the lower stationary polar teeth 12a, 12b, 12c, 12d, 12e and 12f is similarly 60°. The mutual electrical phase between upper and lower stationary poles 11 and 12 is 180°. Phase I excitation coil 14 is wound onto coil bobbin 13 in a circumferential direction.

Figures 5, 6:
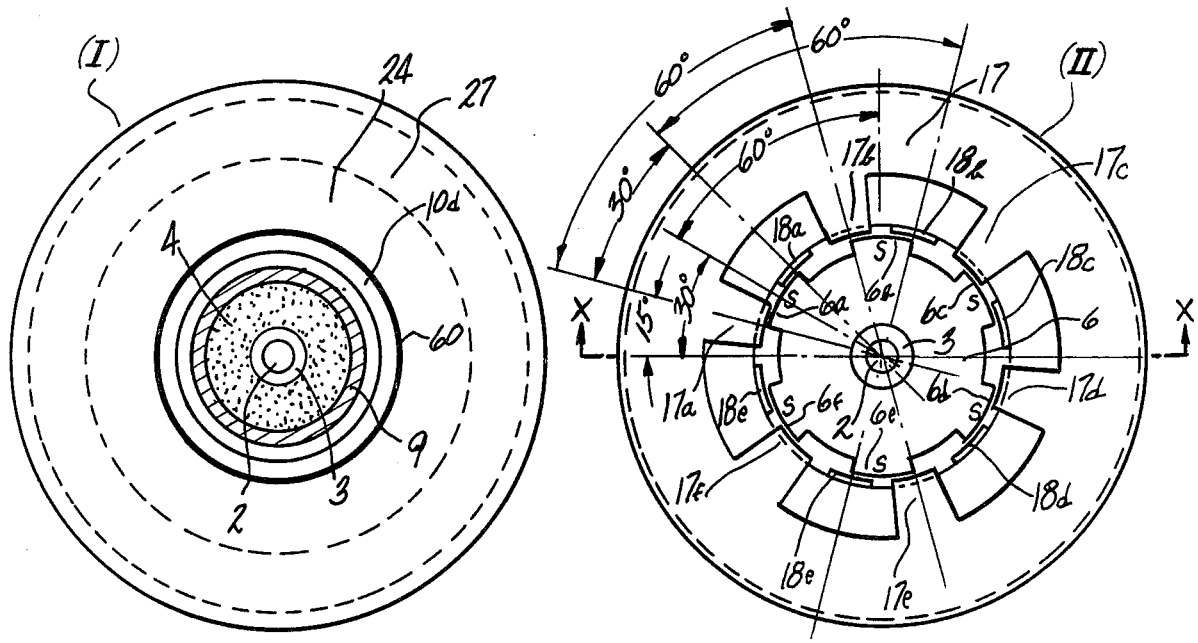
FIG. 5 is a cross-sectional view of the embodiment of FIG. 1 looking along the lines B—B.
FIG. 6 is a cross-sectional view of the embodiment of FIG. 1 along the lines C—C.

FIG. 5 is a cross section of the embodiment of FIG. 1 along the B—B line and shows the reciprocal relationship between the Phase I linear stationary pole 23 and the linear pole 10. Space 60 is fixed and circular.

Referring to FIG. 6, shown therein as a cross sectional view of the embodiment of FIG. 1 along the lines C—C and shows the reciprocal relationship between the phase II rotary pole 6 and the stationary pole 17. The polar teeth 6a, 6b, 6c, 6d, 6e and 6f of rotary pole 6 are at a spatial pitch angle of 60° and tooth 6a of Phase II rotary pole 6 and tooth 5a of Phase I rotary pole 5 are at a phase difference of 180°. Polar teeth 17a, 17b, 17c, 17d, 17e and 17f of the Phase II upper stationary pole 17 are at the same pitch angle as the teeth of rotary pole 6 and tooth 17a is out of phase with respect to the line X—X by 15 spatial degrees. Polar teeth 17a, 17b, 17c, 17d, 17e and 17f are bent downward at a right angle to the surface of paper. Polar teeth 18a, 18b, 18c, 18d, 18e and 18f of the Phase II lower stationary pole 18 are at the same spatial angle as the polar teeth of upper stationary pole 17. Furthermore, the electrical phase relationship between Phase II upper and lower stationary poles 17 and 18 is 180°. Furthermore, polar teeth 18a, 18b, 18c, 18d, 18e and 18f are bent upward at a right angle to the surface of the paper.

In operation, when excitation coil 20 is excited so that Phase I stationary pole 17 becomes the south pole and stationary pole 18 becomes the north pole, armature 1 rotates 15 spatial degrees in a clockwise direction and comes to rest. To advance the armature 1 another 15°, the excitation coil 14 is excited so that the Phase I stationary pole 11 becomes the north pole and the stationary pole 12 becomes the south pole. To cause the armature 1 to rotate in the counterclockwise direction. Phase II excitation coil 20 and Phase I excitation coil 14 are excited in the opposite direction. To continue rotation in any one direction of rotation, repeat the above described excitations. Even when the armature 1 is rotated counterclockwise, excitation in the clockwise direction can be applied. In this way, the compound motor can rotate clockwise or counterclockwise as desired, depending on the program.

Figures 7A, 7B, 8:
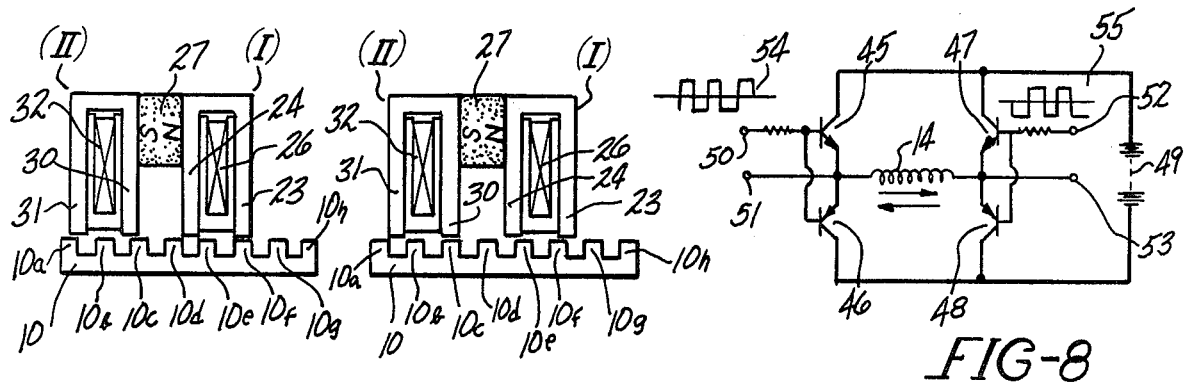
FIGS. 7A, 7B, 7C and 7D are a simplified view of the linear stator poles and linear armature poles of the embodiment of FIG. 1 showing the function thereof.
FIG. 8 is a diagram of a drive circuit which excites the stator poles of the embodiment of FIG. 1.
Figures 7C, 7D:
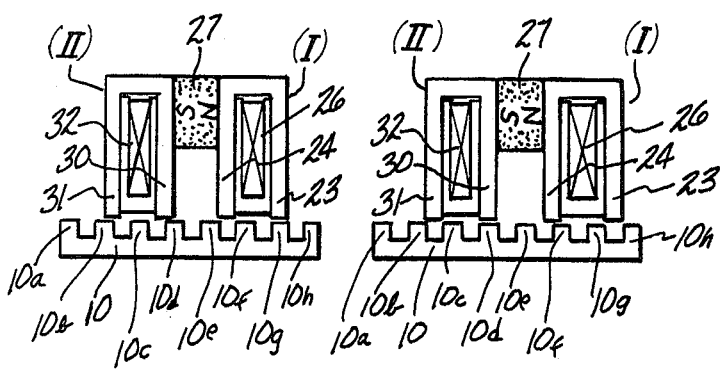

Referring to FIG. 7, shown therein is the linear action of the compound motor. In the position shown in FIG. 7A, the linear pole 10 is magnetically related to the linear stationary pole and stopped. The Phase I stationary pole 23 and the linear polar tooth 10f attract one another as do the stationary pole and the space between linear polar teeth 10d and 10e. The Phase II stationary poles 30 and polar teeth 10c attract each other as do stationary pole 31 and linear polar tooth 10a. Balance is maintained by the bias flux of the permanent magnet 27. In this situation, if we excite the Phase II excitation coil 32 so that the magnetism of pole 30 increases and that of pole 23 decreases. When the magnetism of pole 30 increases and that of pole 23 decreases, the magnetic balance is lost and linear pole 10c is drawn to the fixed pole 30 and moves to the left as shown in FIG. 7B. In the FIG. 7B, we have a situation of magnetic balance again. When the excitation coil 26 is excited so that the Phase I pole 23 loses magnetism and pole 24 gains magnetism, the pole 10e will be drawn towards pole 24 as shown in FIG. 7C. The situation shown in FIG. 7C is again one of magnetic balance. If we now excite the Phase II excitation coil 32 and thus reduce the magnetism of pole 31 and increase that of pole 30, then polar tooth 10b will be drawn towards pole 30 as shown in FIG. 7D. The process is thus repeated to continue linear motion.

To describe the operation of the compound motor to cause the armature to move linearly in the opposite direction, the description will begin with the situation shown in FIG. 7D. When excitation coil 26 is excited so that the magnetism of the Phase I pole 23 increases and that of 24 decreases, the polar tooth 10g will be drawn towards pole 23 shown in FIG. 7c. In the situation shown in FIG. 7C, if the Phase II excitation coil 32 is excited so that the magnetism of pole 31 increases and that of pole 30 decreases, the polar tooth 10b will be drawn towards pole 31 as shown in FIG. 7B. As can be seen from above, the linear action to the left or right in the direction of the shaft can be combined as desired, depending on the program. In this situation, since we can increase or decrease the magnetism of the stationary poles 23, 24, 30 and 31 by altering the bias flux in the stator permanent magnet 27, it is advisable that the flux of the magnets stationary poles 23, 24, 30 and 31 be as uniform as possible whenever there is an absence of excitation from the excitation coil. As is obvious from the explanation given above, achieving the smallest pitch angle or rotation and the least amoutn of linear movement is simply a design choice.

Referring to FIG. 8, shown therein is a circuit diagram for exciting the excitation coils. By applying pulse signals 54 and 55 respectively, between the input terminals 50 and 51 and 52 and 53, we can switch transistors 45 and 48 on the transistors 47 and 46 off, or have transistors 47 and 46 on and transistors 45 and 48 off, and we can reverse the DC power source 48 and 49 applied to excitation coil 14. We can thusly change the excitation direction by combining the programmed pulse signals. Of course, only the exciation coil 14 is shown, but this is also applicable to coils 20, 26 and 32. It is also obvious that the switching element is not restricted to being a transistor, and that other semiconductor devices would be within the scope of the present invention.

Figure 9:
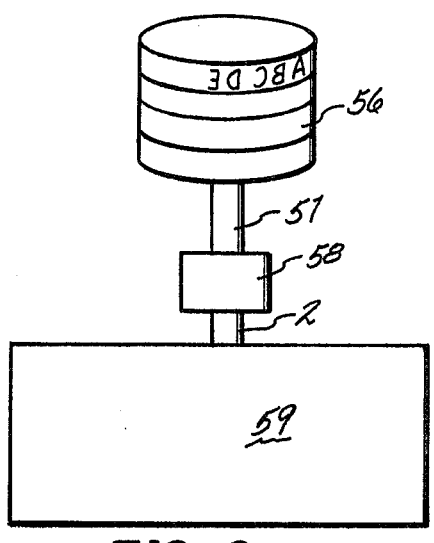
FIG. 9 illustrates the relationship between the letter cap, coupler, and drive printing pulse motor.

Referring to FIG. 9, shown therein is an embodiment of a printer drive. Letter cap 56 is coupled to letter cap shaft 57. Mechanical coupler 58 couples the shaft 2, the printer drive compound pulse motor 59 to letter cap shaft 57. Accordingly, in operation, when compound pulse motor 59 causes shaft 2 to rotate or move linearly, letter cap 56 is rotated or moved linearly.

With this invention, rotary movement and linear motion in the direction of the shaft are achieved with one motor and a compound motor with relatively few parts that is simple in construction and small in size is achieved. As a result, a typewriter and a serial printer which are low in cost and small in size, and whose practical efficacy is outstanding is able to be realized. In all cases, it is understood that the above-described embodiment is merely illustrative of one of the many possible specific embodiments which represent the applications of the principals of the present invention. Furthermore, numerous and varied other arrangements can be readily devised in accordance with the principles of the present invention by those skilled in the art without departing from the spirit and scope of the invention.

I claim:

1. A compound pulse motor comprising:
a motor frame;
an armature rotatably and slideably coupled to said motor frame, said armature comprising linear magnetic poles and rotating magnetic poles, said linear magnetic poles comprising a magnetic member substantially tubular shaped having grooves of a predetermined pitch formed in said tubular magnetic member and being disposed substantially in the center of said armiture and said rotating magnetic poles comprising a pair of cylindrical magnetic members, each of said cylindrical magnetic members having a plurality of radially extending teeth, said pair of cylindrical magnetic members being of opposite magnetic polarity, said cylindrical magnetic members being disposed one on each side of said magnetic member of said linear magnetic poles; and
a stator fixed to said motor frame, said stator comprising stationery linear magnetic poles and stationery rotating magnetic poles;
whereby said armature rotates selectively clockwise or counter-clockwise when said stationary rotating magnetic poles are excited and linearally moves right or left when said stationery linear magnetic poles are excited.

2. A compound pulse motor according to claim 1 wherein said stationary linear poles comrprise a pair of annular coils extending circumfirentially about said armature with an annular permanent magnet extending circumfirentially about said armature sandwiched between said annular coils.

3. A compound pulse motor according to claim 1 further comprising a letter cap, said letter cap being coupled to said armature by a mechanical coupling.

* * * * *